Figure 1:
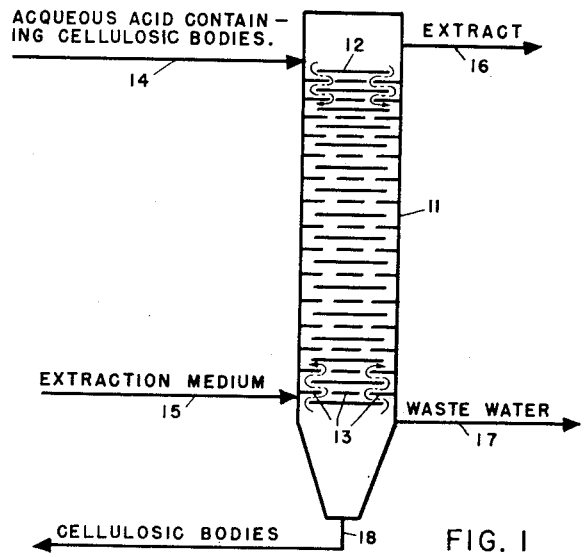

Dec. 15, 1953 — F. N. BENT — 2,662,916
EXTRACTION OF LOWER FATTY ACIDS
Filed Oct. 22, 1952

FRANKLIN N. BENT
INVENTOR.

BY Ernest G. Peterson
AGENT.

Patented Dec. 15, 1953

2,662,916

UNITED STATES PATENT OFFICE 2,662,916

EXTRACTION OF LOWER FATTY ACIDS

Franklin N. Bent, Heysham, England, assignor to Hercules Powder Company, Wilmington, Del., a corporation of Delaware Application October 22, 1952, Serial No. 316,215

9 Claims. (Cl. 260—541)

This invention relates to the extraction of lower fatty acids from weak aqueous solutions thereof, and more particularly to extraction of lower fatty acids from weak aqueous solutions thereof resulting from the manufacture of lower organic esters of cellulose.

Large amounts of weak aqueous acetic acid are produced in the manufacture of cellulose acetate, and such acid must be recovered in a pure concentrated form for re-use in the process. Large amounts of lower aliphatic acids such as acetic, propionic and butyric acids are similarly produced in weak aqueous solution in the manufacture of mixed esters such as cellulose acetate propionate and cellulose acetate butyrate and other esters such as cellulose propionate and cellulose butyrate, and must be recovered in pure concentrated form for re-use in the process. It is conventional practice to recover these acids by extracting with a relatively immiscible organic extracting medium, and then distilling the extract.

Heretofore, however, difficulties have been encountered during extraction because these weak aqueous acids produced in the manufacture of cellulose organic esters are contaminated with small amounts of "cellulosic bodies" dissolved in the weak aqueous acid. By "cellulosic bodies" is meant degradation products arising from cellulose organic ester manufacture. As the weak aqueous acid solution becomes progressively depleted in acid content during the course of extraction, the dissolved cellulosic bodies tend to precipitate in the extracting column. Heretofore these precipitated cellulosic bodies have collected and built up deposits on the plates or packing in the column thus tending to progressively clog the extraction column and interfere with efficient extraction. It has been necessary at relatively short intervals of time to periodically shut down the extraction column to clean out the accumulated deposits of precipitated cellulosic bodies. It is apparent that this is costly and uneconomical. Although various expedients have been proposed for dealing with the cellulosic bodies present in these weak aqueous acids, heretofore none of these have been fully satisfactory.

It has now been discovered that these precipitated cellulosic bodies exhibit unusual and unexpected behavior. At temperatures below 35° C. they are sticky solids exhibiting no viscous flow properties, whereas at temperatures above 35° C. they exhibit viscous flow, the rate of flow increasing with increase in temperature. Thus, 35° C. marks an extremely critical temperature threshold below which the precipitated cellulosic bodies have no viscous flow properties, and above which they exhibit viscous flow.

Now in accordance with this invention advantage is taken of this unexpected behavior of the precipitated cellulosic bodies to maintain uninterrupted operation of the extraction column for substantially longer periods of time than heretofore possible, and, at the same time, the capacity of the extraction equipment, as measured by the volume of contaminated weak acid put through the equipment, is increased. By maintaining the temperature throughout the liquid in the extraction column above 35° C., the precipitated cellulosic bodies exhibit viscous flow and hence flow off the packing in the column and readily move downward through the column and settle as a sludge to the bottom of the column where they are drawn off without interrupting continuous operation of the extracting column, instead of accumulating and building up on the packing as would be the situation at temperatures below 35° C.

According to this invention a lower fatty acid is extracted from a weak aqueous solution thereof contaminated with small amounts of dissolved cellulosic bodies arising from manufacture of organic esters of cellulose by introducing weak aqueous acid contaminated with the aforesaid cellulosic bodies into an extraction column adjacent the upper end thereof, introducing an extraction medium into the extraction column adjacent the lower end thereof, said extraction medium containing from about 40% to about 76% isopropyl ether and from about 60% to about 24% of an organic compound having a boiling point lower than that of the acid being extracted and selected from the class of lower aliphatic esters, and ethers containing from 3 to 5 carbon atoms in the molecule, passing the weak aqueous acid and extraction medium countercurrent to each other through the extraction column to effect extraction of the acid and cause the cellulosic bodies to precipitate, maintaining the temperature throughout the liquid in the extraction column above 35° C. to cause the precipitated cellulosic bodies to exhibit viscous flow and to settle to the bottom of the extraction column, withdrawing the resulting depleted aqueous solution and the precipitated cellulosic bodies from the extraction column adjacent the lower end thereof, and withdrawing the extraction medium enriched with the extracted acid from the extraction column adjacent the upper end thereof.

In a preferred embodiment of the invention, both the weak aqueous acid and the extraction medium are preheated to a temperature above 35° C. before being introduced into the extraction column.

Figure 2:
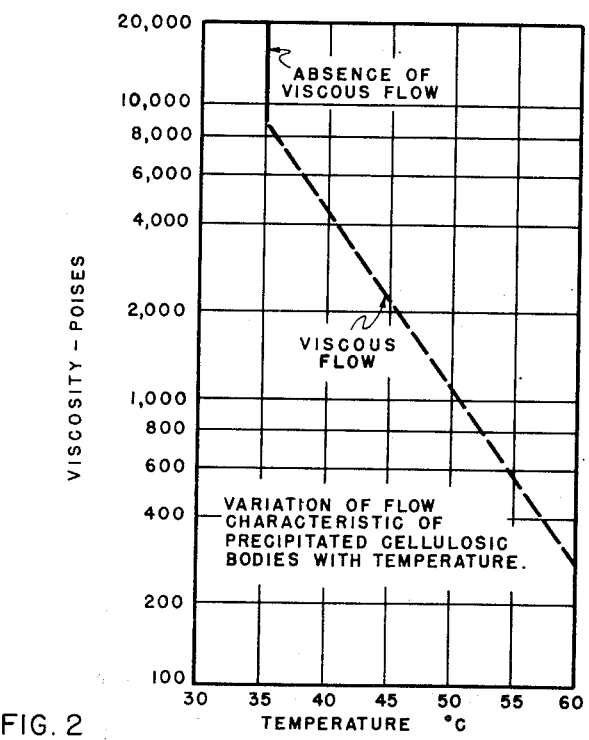

The features of this invention will be more thoroughly understood from the following description taken in conjunction with the accompanying drawing forming a part of the specification wherein Fig. 1 is a diagrammatic representation of an extraction column used in practicing the invention, and Fig. 2 is a graph illustrating the flow characteristics of the precipitated cellulosic bodies at various temperatures. In the following description the process is conducted with extraction medium having a lower specific gravity than the weak aqueous acid solution so that when introduced into the column the extraction medium rises and the weak aqueous acid sinks in countercurrent relationship in the column.

Referring to Fig. 1, weak aqueous acid contaminated with cellulosic bodies arising from cellulose organic ester manufacture, preferably preheated to a temperature above 35° C., is continuously introduced into extraction column 11 provided with alternate sets of baffle plates 12 and 13 through a line 14 adjacent the upper end of the column. Extraction medium, preferably preheated to a temperature above 35° C., is continuously introduced into extraction column 11 through a line 15 adjacent the lower end of the column. Since the extraction medium is of lower specific gravity than the weak aqueous acid, it rises through the extraction column and the weak acid sinks, thus establishing intimate countercurrent contact between the two liquids in the column. The rate of flow is so adjusted that the extraction column is always full of liquid, and the temperature throughout the body of liquid in the extraction column is maintained above 35° C. As the weak aqueous acid moves downward through the column it becomes progressively weaker in acid content, due to extraction of the acid by the countercurrently moving extraction medium, and the dissolved cellulosic bodies precipitate from solution. Depleted aqueous solution is continuously withdrawn from the extraction column through waste water line 17 adjacent the lower end of the extractor, and extraction medium enriched with extracted acid is continuously withdrawn through extract line 16 adjacent the upper end of the column. The precipitated cellulosic bodies readily move downward through the column and settle as a sludge to the bottom of extraction column 11 and are withdrawn through a line 18 adjacent the bottom of the column.

With reference to Fig. 2, it is apparent that 35° C. marks an extremely critical temperature threshold below which the precipitated cellulosic bodies have no viscous flow properties, and above which they exhibit viscous flow. Hence, by maintaining the temperature throughout the liquid in the extraction column above 35° C., the precipitated cellulosic bodies exhibit viscous flow and flow off the plates or packing in the column and settle as a sludge to the bottom of the column, instead of accumulating and building up on the plates or packing, as would be the situation at temperatures below 35° C.

The invention is illustrated by the following specific embodiment in which a weak aqueous solution of acetic acid contaminated with small amounts of cellulosic bodies arising from the manufacture of cellulose acetate is extracted in accordance with this invention. It is to be understood, however, that this example is not to be construed as a limitation of the invention.

EXAMPLE

With reference to Fig. 1, weak aqueous acetic acid containing 21% acetic acid and 1% of dissolved cellulosic bodies arising from cellulose acetate manufacture was preheated to 40° C. in a conventional heat exchanger (not shown) and was continuously introduced into the extraction column 11 through the aqueous acid line 14. An extraction medium consisting of equal parts by weight of isopropyl ether and ethyl acetate was preheated to 40° C. in a conventional heat exchanger (not shown) and was continuously introduced into the extraction column 11 through the extraction medium line 15. On a volume basis, 2.5 volumes of extraction medium were introduced into the extraction column for each volume of weak aqueous acid introduced. The body of liquid in the extraction column was maintained throughout at approximately 40° C. Depleted aqueous solution containing approximately 0.1% acetic acid was continuously withdrawn from the column through waste water line 17 and extraction medium enriched with extracted acetic acid was continuously withdrawn from the column through extract line 16. Dissolved cellulosic bodies precipitated from the aqueous acid solution during the course of the extraction. Since the temperature throughout the liquid in the extraction column was maintained at approximately 40° C., the precipitated cellulosic bodies exhibited viscous flow and readily moved downward through the column and settled as a sludge at the bottom thereof, from which they were periodically removed through the cellulosic bodies line 18. The throughput in terms of weak aqueous acetic acid was 26 gallons per minute.

The same extraction column operating with the same weak acid and the same extraction medium in the same volume relationship between the two, but with the body of liquid in the extraction column maintained throughout at room temperature, showed a throughput in terms of weak aqueous acetic acid of 20 gallons per minute. At the same time the precipitated cellulosic bodies did not exhibit viscous flow and tended to accumulate and build up on the plates of the column, to progressively clog the extraction column and reduce the efficiency of the column. Operating in accordance with this invention, production in terms of continuous operation has been increased by over 300%, and in terms of throughput per unit of time by 30%.

It is very important in accordance with this invention to maintain the temperature throughout the liquid in the extraction column above 35° C., for this marks an extremely critical temperature threshold below which the precipitated cellulosic bodies have not viscous flow properties, and above which they exhibit viscous flow. It is not sufficient that part of the liquid in the column be above 35° C. and another part below 35° C., for in this case at least part of the liquid in the extraction column will be at a temperature below which the precipitated cellulosic bodies exhibit viscous flow, and they will accumulate and build up on the plates or packing in the column to clog the extraction column. This would be the situation if the extraction medium was heated, for example, to a temperature of say 45° to 60° C. and introduced into the column, and the weak aqueous acid was introduced into the column at room temperature or below. Under these circumstances a substantial part of the liquid in the extraction column would be below the critical temperature threshold of 35° C. in accordance with this invention, and precipitated cellulosic bodies would accumulate and build up deposits on the plates or packing of the extraction column. On the other hand, there is no objection to having a temperature gradient in the liquid in the column, provided that the temperature throughout the liquid in the column is above 35° C. It is preferred, however, to maintain the body of liquid in the column at approximately the same temperature throughout, within a few degrees of a desired operating temperature.

Whereas 35° C. marks a critical minimum temperature threshold for operability in accordance with this invention, there is no similar critical upper limit. For practical reasons it is desirable to select temperatures below the boiling point of the extraction medium employed. Hence, it is apparent that there is considerable choice in respect to the maximum temperature which can be employed, depending upon the composition of the extraction medium selected. In general, however, temperatures in the liquid in the extraction column seldom exceed 60° C. When operating with an isopropyl ether-ethyl acetate extraction medium, a preferred temperature for the body of liquid in the extraction column is between 35° C. and about 45° C.

In the preferred mode of operation, the elevated extraction temperature in the body of liquid in the extraction column is obtained by preheating both the weak aqueous acid and the extraction medium to the desired temperature prior to introducing them into the column. It is possible, however, to obtain elevated extraction temperature in accordance with this invention by vessel jacketing, internal or external steam coils, or introduction of steam directly into the body of liquid in the extraction column at suitable points. If steam introduction is employed, the steam needs only sufficient pressure to overcome the static head above the point of entry to the column. By adjusting the flow of steam at suitable points, uniform temperature throughout the body of liquid in the column can readily be maintained.

As illustrated by the foregoing example, the process in accordance with this invention is particularly useful for extracting acetic acid from a weak aqueous solution thereof contaminated with small amounts of cellulosic bodies arising from the manufacture of cellulose acetate. The invention, however, is not limited to the extraction of acetic acid, but is applicable for the extraction of any of the lower fatty acids from weak aqueous solutions thereof produced in the manufacture of any of the lower fatty acid esters of cellulose, including cellulose acetate, cellulose propionate, cellulose butyrate, cellulose acetate propionate, cellulose acetate butyrate, cellulose propionate butyrate, and others. Such weak acids may contain as high as 30 or 35% by weight or even more of the acid to be recovered by extraction. The process, however, is particularly applicable to weak aqueous acid solutions containing from about 15% to about 25% lower fatty acid.

These weak aqueous acids produced in the manufacture of the lower fatty acid esters of cellulose are always contaminated with small amounts of dissolved cellulosic bodies. The amount present in any particular weak acid solution will, of course, vary considerably, depending upon the particular manufacturing process involved, but will usually be on the order of 0.5% or less. Seldom will these cellulosic bodies be present in amounts exceeding 2%.

The extraction medium in accordance with this invention contains from about 40% to about 76% isopropyl ether and from about 60% to about 24% of an organic compound having a boiling point lower than that of the acid being extracted and selected from the class of lower aliphatic esters, and ethers containing from 3 to 5 carbon atoms in the molecule. Thus, the extraction medium is a mixture of two organic liquids, one of which is isopropyl ether and the other is a lower aliphatic ester, or an ether containing from 3 to 5 carbon atoms in the molecule.

The isopropyl ether component of the extraction medium has a high selectivity in that it dissolves or extracts substantially no water from the weak aqueous acid, but its solvent power for the acid is less than that desirable in that it does not extract sufficient acid from the weak aqueous acid. On the other hand, the other component of the extraction medium, such as ethyl acetate, and like solvents, possesses a high solvent power for the acid but is insufficiently selective. These two types of solvents are miscible in each other and when combined together, in accordance with this invention, result in a solvent blend characterized by both a high solvent power and high selectivity. This results from the fact that the ethyl acetate, or like solvent, readily extracts the acid from the aqueous solution but is prevented from carrying large amounts of water into the extract phase due to the presence of the isopropyl ether. In addition, the isopropyl ether contributes its own solvent power for the acid, which is reasonably high with respect to stronger acid solutions.

The proportions of the two solvents employed in forming the extraction medium may be varied within considerable limits but experience has shown that the most efficient results are had when the extraction medium contains from about 40% to about 76% by weight of isopropyl ether and about 60% to about 24% of the complementary solvent. A preferred extraction medium for the extraction of acetic acid contains approximately equal parts by weight of isopropyl ether and ethyl acetate.

While ethyl acetate meets the requirements as the complementary solvent, there may be employed in place of the ethyl acetate other solvents having a lower boiling point than that of the acid being extracted, such as lower aliphatic esters, or ethers containing from 3 to 5 carbon atoms in the molecule, and having relatively high partition coefficients and solvent power for the acid being extracted. Examples of these include methyl acetate, propyl acetate, isopropyl acetate, butyl acetate, methyl formate, ethyl formate, propyl formate, isopropyl formate, butyl formate, methyl propionate, ethyl propionate, methyl ethyl ether, diethyl ether, methyl propyl ether, methyl isopropyl ether, methyl butyl ether, ethyl propyl ether, and others.

It will be apparent to one skilled in the art that the ratio of weak aqueous acid to extraction medium will vary considerably, depending upon the composition of the weak aqueous acid solution as well as the composition of the extraction medium. When extracting acetic acid with a medium containing isopropyl ether and ethyl acetate, the ratio is about 2.5 parts by volume of extraction medium to 1 part weak aqueous acid. In general, the ratio of weak acid to extraction medium is so adjusted that the depleted aqueous solution withdrawn from the column contains no more than about 0.1% of the acid being extracted. For obvious reasons, the throughput rate will be maintained at the highest possible volume compatible with efficient extraction of the acid.

The process in accordance with this invention is operable with any conventional extraction tower, including packed towers, towers equipped with perforated plates or baffle plates and others, with or without means for agitating.

In comparison to prior conventional extraction methods, this invention has the advantage of substantially increasing trouble-free continuous operation. At the same time, the capacity of an extraction column is greatly increased in terms of the volume of weak aqueous acid which can be put through the column in a unit of time.

This is a continuation in part of my application Serial Number 128,828, filed on November 22, 1949, now abandoned.

What I claim and desire to protect by Letters Patent is:

1. A process for extracting a lower fatty acid from a weak aqueous solution thereof contaminated with small amounts of dissolved cellulosic bodies arising from cellulose organic ester manufacture which comprises introducing weak aqueous acid contaminated with the aforesaid cellulosic bodies into an extraction column adjacent the upper end thereof, introducing an extraction medium into the extraction column adjacent the lower end thereof, said extraction medium containing from about 40% to about 76% isopropyl ether and from about 60% to about 24% of an organic compound having a boiling point lower than that of the acid being extracted and selected from the class of lower aliphatic esters, and ethers containing from 3 to 5 carbon atoms in the molecule, passing the weak aqueous acid and extraction medium countercurrent to each other through the extraction column to effect extraction of the acid and cause the cellulosic bodies to precipitate, maintaining the temperature throughout the liquid in the extraction column above 35° C. to cause the precipitated cellulosic bodies to exhibit viscous flow and to settle to the bottom of the extraction column, withdrawing the resulting depleted aqueous solution and the precipitated cellulosic bodies from the extraction column adjacent the lower end thereof, and withdrawing the extraction medium enriched with the extracted acid from the extraction column adjacent the upper end thereof.

2. A process for extracting acetic acid from a weak aqueous solution thereof contaminated with small amounts of dissolved cellulosic bodies arising from cellulose acetate manufacture which comprises introducing weak aqueous acetic acid contaminated with the aforesaid cellulosic bodies into an extraction column adjacent the upper end thereof, introducing an extraction medium into the extraction column adjacent the lower end thereof, said extraction medium containing from about 40% to about 76% isopropyl ether and from about 60% to about 24% of an organic compound having a boiling point lower than that of the acid being extracted and selected from the class of lower aliphatic esters, and ethers containing from 3 to 5 carbon atoms in the molecule, passing the weak aqueous acid and extraction medium countercurrent to each other through the extraction column to effect extraction of the acid and cause the cellulosic bodies to precipitate, maintaining the temperature throughout the liquid in the extraction column above 35° C. to cause the precipitated cellulosic bodies to exhibit viscous flow and to settle to the bottom of the extraction column, withdrawing the resulting depleted aqueous solution and the precipitated cellulosic bodies from the extraction column adjacent the lower end thereof, and withdrawing the extraction medium enriched with the extracted acid from the extraction column adjacent the upper end thereof.

3. A process for extracting acetic acid from a weak aqueous solution thereof contaminated with small amounts of dissolved cellulosic bodies arising from cellulose acetate manufacture which comprises preheating weak aqueous acetic acid contaminated with the aforesaid cellulosic bodies to a temperature above 35° C., introducing the preheated weak aqueous acetic acid into an extraction column adjacent the upper end thereof, preheating an extraction medium to a temperature above 35° C., said extraction medium containing from about 40% to about 76% isopropyl ether and from about 60% to about 24% of an organic compound having a boiling point lower than that of the acid being extracted and selected from the class of lower aliphatic esters, and ethers containing from 3 to 5 carbon atoms in the molecule, introducing the preheated extraction medium into the extraction column adjacent the lower end thereof, passing the weak aqueous acid and extraction medium countercurrent to each other through the extraction column to effect extraction of the acid and cause the cellulosic bodies to precipitate, maintaining the temperature throughout the liquid in the extraction column above 35° C. to cause the precipitated cellulosic bodies to exhibit viscous flow and to settle to the bottom of the extraction column, withdrawing the resulting depleted aqueous solution and the precipitated cellulosic bodies from the extraction column adjacent the lower end thereof, and withdrawing the extraction medium enriched with the extracted acid from the extraction column adjacent the upper end thereof.

4. A process for extracting acetic acid from a weak aqueous solution thereof contaminated with small amounts of dissolved cellulosic bodies arising from cellulose acetate manufacture which comprises preheating weak aqueous acetic acid contaminated with the aforesaid cellulosic bodies to approximately 40° C., introducing the preheated weak aqueous acetic acid into an extraction column adjacent the upper end thereof, preheating an extraction medium to approximately 40° C., said extraction medium containing approximately equal parts by weight of isopropyl ether and ethyl acetate, introducing the preheated extraction medium into the extraction column adjacent the lower end thereof, passing the weak aqueous acid and extraction medium countercurrent to each other through the extraction column to effect extraction of the acid and cause the cellulosic bodies to precipitate, maintaining the temperature throughout the liquid in the extraction column at approximately 40° C. to cause the precipitated cellulosic bodies to exhibit plastic flow and to settle to the bottom of the extraction column, withdrawing the resulting depleted aqueous solution and the precipitated cellulosic bodies from the extraction column adjacent the lower end thereof, and withdrawing the extraction medium enriched with the extracted acid from the extraction column adjacent the upper end thereof.

5. A process in accordance with claim 3 in which the extraction medium contains from about 40% to about 76% isopropyl ether and from about 60% to about 24% of ethyl acetate.

6. A process in accordance with claim 3 in which the extraction medium contains from about 40% to about 76% isopropyl ether and from about 60% to about 24% of methyl acetate.

7. A process in accordance with claim 3 in which the extraction medium contains from about 40% to about 76% isopropyl ether and from about 60% to about 24% of methyl propionate.

8. A process in accordance with claim 3 in which the extraction medium contains from about 40% to about 76% isopropyl ether and from about 60% to about 24% of ethyl propyl ether.

9. A process in accordance with claim 3 in which the extraction medium contains from about 40% to about 76% isopropyl ether and from about 60% to about 24% of methyl isopropyl ether.

FRANKLIN N. BENT.

No references cited.